US012718522B2

(12) United States Patent
Mopur et al.

(10) Patent No.: US 12,718,522 B2
(45) Date of Patent: Aug. 25, 2026

(54) DATA SKEW DETECTION IN MACHINE LEARNING ENVIRONMENTS

(71) Applicant: HEWLETT PACKARD ENTERPRISE DEVELOPMENT LP, Spring, TX (US)

(72) Inventors: Satish Kumar Mopur, Bangalore (IN); Gunalan Perumal Vijayan, Bangalore (IN); Shounak Bandopadhyay, Bangalore (IN); Vijaya Sharvani Hindnavis, Bangalore (IN); Krishnaprasad Lingadahalli Shastry, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 657 days.

(21) Appl. No.: 18/184,465

(22) Filed: Mar. 15, 2023

(65) Prior Publication Data

US 2024/0312180 A1 Sep. 19, 2024

(51) Int. Cl.
*G06V 10/26* (2022.01)
*G06V 10/42* (2022.01)
*G06V 10/762* (2022.01)

(52) U.S. Cl.
CPC ............ *G06V 10/762* (2022.01); *G06V 10/26* (2022.01); *G06V 10/42* (2022.01)

(58) Field of Classification Search
CPC ...... G06V 10/762; G06V 10/26; G06V 10/42; G06V 10/761; G06V 10/774; G06N 3/08
See application file for complete search history.

(56) References Cited

U.S. PATENT DOCUMENTS 11,625,602 B2 * 4/2023 Sarferaz ................. G06N 20/00 706/25
12,423,975 B2 * 9/2025 Liu ........................ G06V 20/46
(Continued)

OTHER PUBLICATIONS

Y. J. Lee and K. Grauman, "Object-Graphs for Context-Aware Visual Category Discovery," in IEEE Transactions on Pattern Analysis and Machine Intelligence (Year: 2011).*
(Continued)

*Primary Examiner* — Andrew M Moyer
*Assistant Examiner* — Ahmed A Nasher
(74) *Attorney, Agent, or Firm* — Hewlett Packard Enterprise Patent Department

(57) ABSTRACT

Systems and methods for preventing prediction performance degradation by detecting and extracting skews in data during both training and production environments is described herein. Feature extraction may be performed on training data during the training phase, followed by pattern analysis that assesses similarities across labeled training data sets. A reference pattern may be derived from the pattern analysis and feature extraction of the training data. Feature extraction and pattern analysis may be performed on production data during the serving phase, and a target pattern may be derived from the pattern analysis and feature extraction of the production data. The reference pattern and target pattern may be fed to a discrepancy detection functionality to detect discrepancies by using a sliding window to move the target pattern across the reference pattern to make comparisons between the patterns. The comparison may provide a quantitative skew across the training and production data.

20 Claims, 6 Drawing Sheets

(56) References Cited

U.S. PATENT DOCUMENTS

| | | | | |
|---|---|---|---|---|
| 2018/0115763 | A1* | 4/2018 | Hung | H04N 13/239 |
| 2019/0050368 | A1* | 2/2019 | Chen | G06N 20/10 |
| 2019/0102674 | A1* | 4/2019 | Kwant | G06N 3/091 |
| 2022/0053010 | A1 | 2/2022 | Elyashiv et al. | |
| 2023/0115248 | A1* | 4/2023 | Di Castro | G06T 7/11<br>375/240.25 |
| 2023/0281958 | A1* | 9/2023 | Mopur | G06N 3/0455<br>382/155 |
| 2024/0096058 | A1* | 3/2024 | Svantesson | G06V 10/26 |
| 2025/0265717 | A1* | 8/2025 | Janisch | G06T 7/0004 |

OTHER PUBLICATIONS

Fiddler, "Fiddler AI—ML Model Monitoring and Model Performance Management", available online at <https://www.fiddler.ai/>, 2023, 6 pages.
Huyen, C., "Data Disribution Shifts and Monitoring", Feb. 7, 2022, 33 pages.
Johnson, P. A., et al., "Laboratory earthquake forecasting: A machine learning competition", Feb. 6, 2007, 10 pages.
Martin Zinkevich, "Rules of Machine Learning: Best Practices for ML Engineering", available online at <https://developers.google.com/machine-learning/guides/rules-of-ml#:~:text=Training%2Dserving%20skew%20is%20a,train%20and%20when%20you%20serve.>, Jul. 18, 2022, 28 pages.
NIH, "NIH Clinical Center provides one of the largest publicly available chest x-ray datasets to scientific community", available online at <https://www.nih.gov/news-events/news-releases/nih-clinical-center-provides-one-largest-publicly-available-chest-x-ray-datasets-scientific-community>, Sep. 27, 2017, 4 pages.
Sato et al., "Monitor models for training-serving skew with Vertex AI", available online at <https://cloud.google.com/blog/topics/developers-practitioners/monitor-models-training-serving-skew-vertex-ai>, Jul. 31, 2021, 12 pages.
Shankar, S. "The Modern ML Monitoring Mess: Research Challenges", Jan. 31, 2022, 17 pages.
TruEra, "TruEra—leader in ML testing, quality management, and monitoring", available online at <https://truera.com/>, 2021, 14 pages.
Breck et al., "Data Validation for Machine Learning", Proceedings of the 2nd SysML Conference, 2019, 14 pages.
Github, "SeldonIO / alibi-detect", available online at <https://web.archive.org/web/20220320144114/https://github.com/SeldonIO/alibi-detect>, 12 pages.
Polyzotis et al., "Data Management Challenges in Production Machine Learning", ACM International Conference, 2017, 122 pages.
The Full Stack, "Lecture 6: MLOps Infrastructure & Tooling", available online at <https://fullstackdeeplearning.com/spring2021/lecture-6/>, 5 pages.

* cited by examiner

Computing Component 500

Hardware Processors 502

Machine-Readable Storage Media 504

Obtaining a Reference Pattern associated with Training Images 506

Obtaining a Target Pattern associated with Production Images 508

Performing Discrepancy Detection between the Target Pattern and the Reference Pattern 510

Determining a Skew between the Target Pattern and the Reference Pattern 512

Sending a Notification of the Skew to the System to Initiate Remedial Actions to Resolve the Skew. 514

FIG. 5

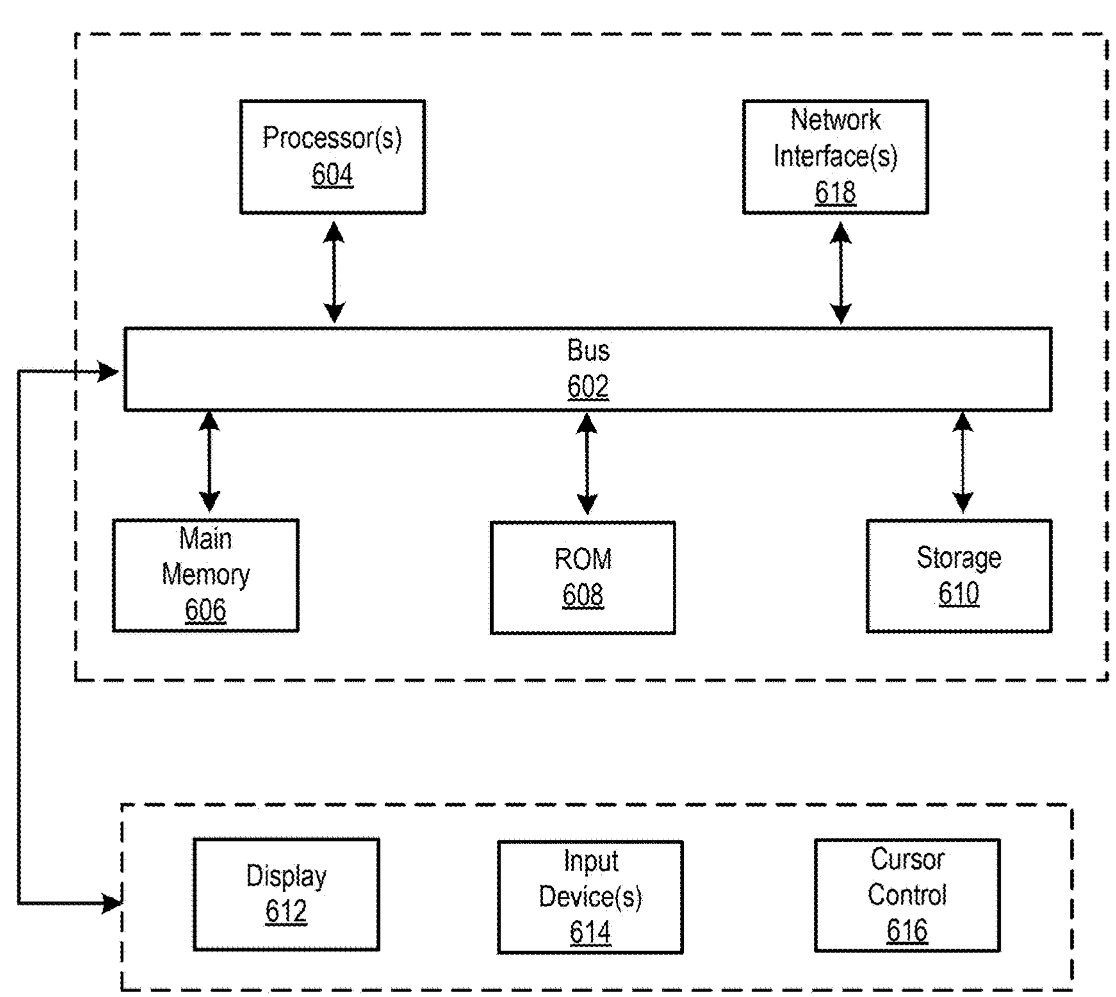
FIG. 6

DATA SKEW DETECTION IN MACHINE LEARNING ENVIRONMENTS

BACKGROUND

The use of Artificial Intelligence (AI) has spread through many industries such as healthcare, manufacturing, finance, and life science, and deep learning with large datasets is now a main technology for solving real-world problems in such industries. Deep learning is used in many cases such as image classification, time series prediction and natural language processing (NLP). However, machine learning (ML) consumers face challenges with prediction performance degradation when ML models are trained with data that no longer represent real-world data distribution.

Prediction performance degradation may occur at production due to the expectation that the model data acquired during the serving phase (also known as the inference phase) at production will be of similar characteristics as the model data acquired at training. The serving phase at production is the duration when a ML model(s) is being used to provide a service, which in this case is to make predictions, or inferences, of results based on the real-world data collected during the runtime of real-world events. Skews, or differences, between model data at production and model data at training may be caused by (1) discrepancy in real-world data during training from real-world data during the serving phase at production, (2) differences in data transformation, e.g., removing a feature of the data processing during the serving phase at production, and (3) ML models process batched data during training but ML models process data in smaller, streamed groups during the serving phase. Such discrepancies may lead to a decay in model performance during the serving phase at production and result in inaccurate model predictions at production. In high stake environments, such as healthcare and finance, any discrepancies may lead to extreme consequences and compliance violations.

BRIEF DESCRIPTION OF THE DRAWINGS

The present disclosure, in accordance with one or more various examples, is described in detail with reference to the following figures. The figures are provided for purposes of illustration only and merely depict typical or example examples. These illustrative examples are mentioned not to limit or define the disclosure, but to provide examples to aid understanding thereof. Additional examples are discussed in the Detailed Description, and further description is provided there.

FIG. 5 is an example computing component that includes one or more hardware processors and machine-readable storage media storing a set of machine-readable/machine-executable instructions that, when executed, cause the one or more hardware processors to perform an illustrative method of detecting data skew between production data and training data, according to various examples of the present disclosure.

FIG. 6 illustrates a block diagram of an example computer system in which various examples of the present disclosure may be implemented.

Figure 1:
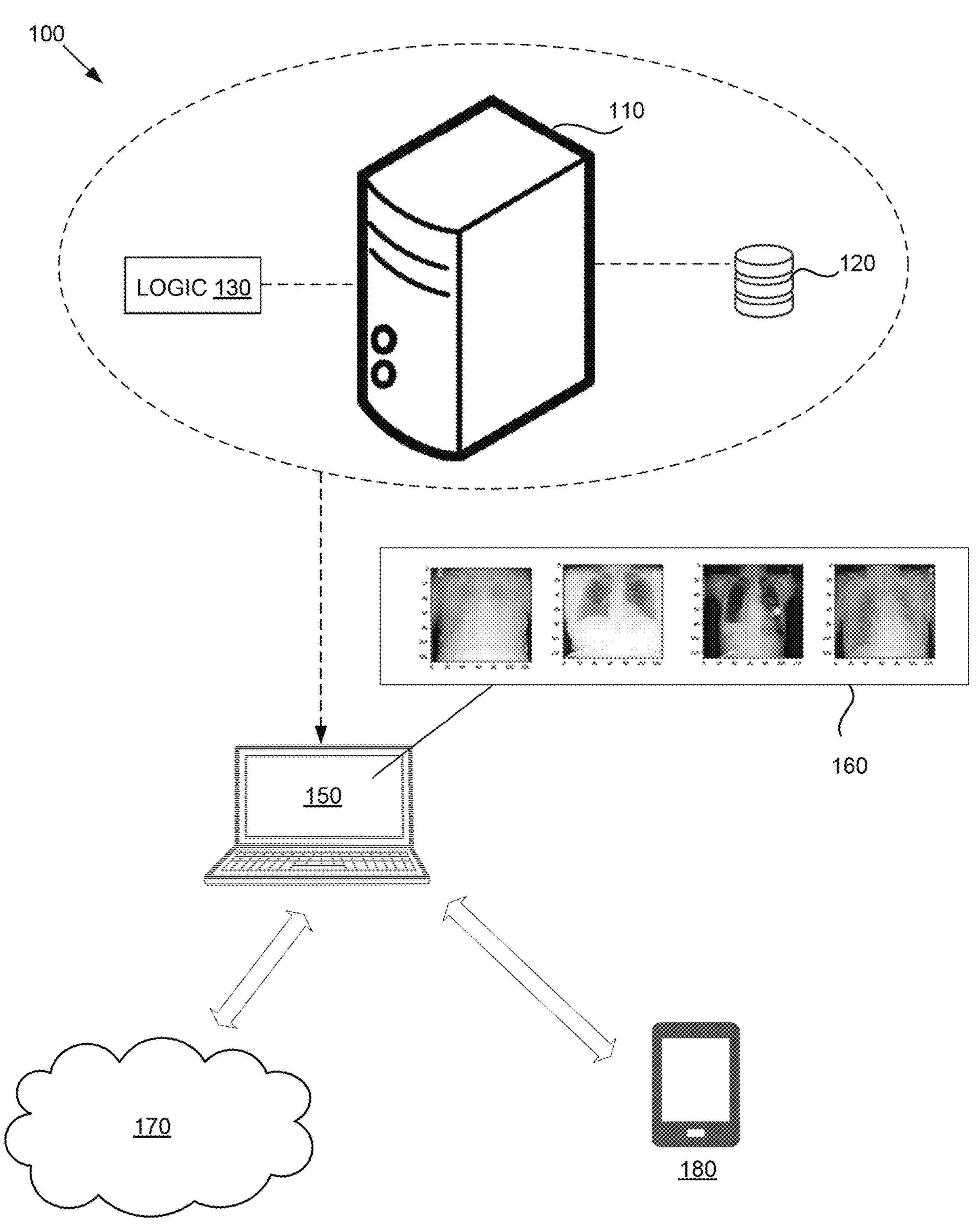
FIG. 1 is an example illustration of a computing system that detects and extracts skews in data to prevent prediction performance degradation in datasets, according to examples described in the present disclosure.

The figures are not exhaustive and do not limit the present disclosure to the precise form disclosed.

DETAILED DESCRIPTION

Described herein are solutions that address the problems of prediction performance degradation. A proposed solution to prevent prediction performance degradation is by detecting and extracting skews in data, during both training and production environments. During the training phase, feature extraction may be performed on a labeled training data set followed by a pattern analysis that assesses similarities across the data set. The features may be grouped using an unsupervised technique such as clustering-based segmentation, and then and stored in a feature database also referred to as a feature store. A distribution reference pattern may then be derived from the training data. During the serving phase at production, feature extraction and pattern analysis may be performed on initial batches of unlabeled production data. The unlabeled serving data may then be clustered and put into groups, based on the feature extraction and pattern analysis and a target pattern is derived and stored in the feature store. The production data may be labeled based on the performed feature extraction and pattern analysis.

The reference pattern and the target pattern may be fed to a discrepancy detection function, where discrepancies are detected by moving the target pattern across the range of the reference pattern using a sliding window and making comparisons between the target pattern and the reference pattern. The comparison of the target pattern and the reference pattern may be performed using a vector-space quantitative distance technique between the two pattern distributions. The vector-space quantitative distance technique may provide a quantitative skew in the data across the training and serving data that is extracted and presented to the user.

Examples of the disclosed technology use image dataset support with a feature-level pattern amalgamation across the labeled dataset, and a moving window-based skew detector across data distribution segments of target and reference patterns. Image dataset support is the use of ML algorithms to train ML models in identifying and recognizing information in images in datasets. The feature-level pattern amalgamation is the function of identifying patterns across features in images of a dataset of a particular label by amalgamating, or combining, the histograms of each image in the dataset together. This invention may be extended to detect skews across structured data sets. This invention may further be extended, without impacting skew detection, to enhance the image similarity detection technique for color images wherein the RGB patterns may be varying to cater to a wider range of image dataset use cases.

Examples of the disclosed technology may be executed during the training phase to assess skewness across training and validation data. Skewness is a measure of the deviation, or difference, between data. The invention may also be executed to assess skewness across training and serving data at any point during production, otherwise referred to as run-time. This may ensure upfront detection, as well as runtime detection, of skew, and allow a user to address skewness in data and mitigate inaccuracies in model prediction during the inference phase. These and other features of the examples of the present disclosure are discussed herein.

FIG. 1 illustrates an example of a computing system 100 which may be internal or otherwise associated within a device 150. In some examples, the computing system 100 may be a ML pipeline and model. In some examples, the device 150 may be a computing device, such as a desktop computer, a laptop, a mobile phone, a tablet device, an Internet of Things (IoT) device, etc. The device 150 may output and display an image 160 of a dataset on a screen of device 150. The image 160 may be a two dimensional (2D) or three dimensional (3D) graphical representation of a dataset, such as x-rays, photos, drawings, etc., showing various features, attributes, and classifications of objects in the graphical representation. The device 150 may include a computing component 110. The computing component 110 may perform one or more available assessments on input image datasets to detect any potential skew in the data. The image 160 may display any potential data skews on the input image datasets based on the one or more performed assessments.

The computing component 110 may include one or more hardware processors and logic 130 that implements instructions to carry out the functions of the computing component 110, for example, obtaining training data to train Machine Learning (ML) models using ML algorithms, wherein the training data comprises one or more training images; performing feature extraction on the one or more training images by: extracting one or more training features of a first training image of the one or more training images by conducting image segmentation on the first training image; extracting training superpixel groups of the first training image associated to the one or more training features, wherein a superpixel group comprises one or more pixels associated with a feature of an image; and labeling the first training image according to the one or more training features of the first training image; performing dissimilarity assessment on each of the one or more training images to generate one or more training histograms, wherein each training image has an associated training histogram; grouping the first training image and associated first training histogram into the first label group of a plurality of label groups of the training data according to the label of the first training image, wherein the first label group comprises training images and associated training histograms of the same label; and amalgamating the one or more training histograms of the first label group to generate the reference pattern associated to training images of the first label group. The computing component 110 may obtain the training data from an entity 170. The entity 170 may input the training data into the device 150 for the computing component 110 to access. The entity 170 may be a separate computing system, a separate computing device, a user, etc.

The computing component 110 may include one or more hardware processors and logic 130 that implements instructions to further carry out the functions of the computing component 110, for example, receiving, from the user, one or more production images; performing feature extraction on the one or more production images by: extracting one or more production features of a first production image of the one or more production images by conducting image segmentation on the first production image; extracting production superpixel groups of the first production image associated to the one or more production features, wherein a superpixel group comprises one or more pixels associated with a feature of an image; and labeling the first production image according to the one or more production features of the first production image; performing dissimilarity assessment on each of the one or more production images to generate one or more production histograms, wherein each production image has an associated production histogram; grouping the first production image and associated first production histogram into the first label group of a plurality of label groups according to the label of the first production image, wherein the first label group comprises production images and associated production histograms of the same label; and amalgamating the one or more production histograms of the first label group to generate the target pattern associated to production images of the first label group. The computing component 110 may receive the one or more production images from an entity 180. The entity 180 may input the production images into the device 150 for the computing component 110 to access. The entity 180 may be a separate computing system, a separate computing device, a user, etc.

The computing component 110 may include one or more hardware processors and logic 130 that implements instructions to further carry out the functions of the computing component 110, for example, obtaining a reference pattern associated to training images of a first label group; obtaining a target pattern associated to production images of the first label group; performing discrepancy detection between the target pattern and the reference pattern of the first label group by: analyzing the target pattern of the first label group; analyzing the reference pattern of the first label group; and determining one or more areas of the target pattern that deviate from the reference pattern and corresponding amounts of distance separation between the target pattern and the reference pattern; determining a skew between the target pattern and the reference pattern of the first label group, wherein the skew is the maximum distance separation between the target pattern and the reference pattern; and sending a notification of the skew to a system for the system to initiate remedial actions to resolve the skew, wherein the notification comprises analysis and results of the target pattern, the reference pattern and the skew.

The computing component 110 may store, in a database 120, details regarding scenarios or conditions in which some algorithms, image datasets, and assessments are performed and used to determine potential data skews in training and production image datasets. Some of the scenarios or conditions will be illustrated in the subsequent FIGS.

Figure 2:
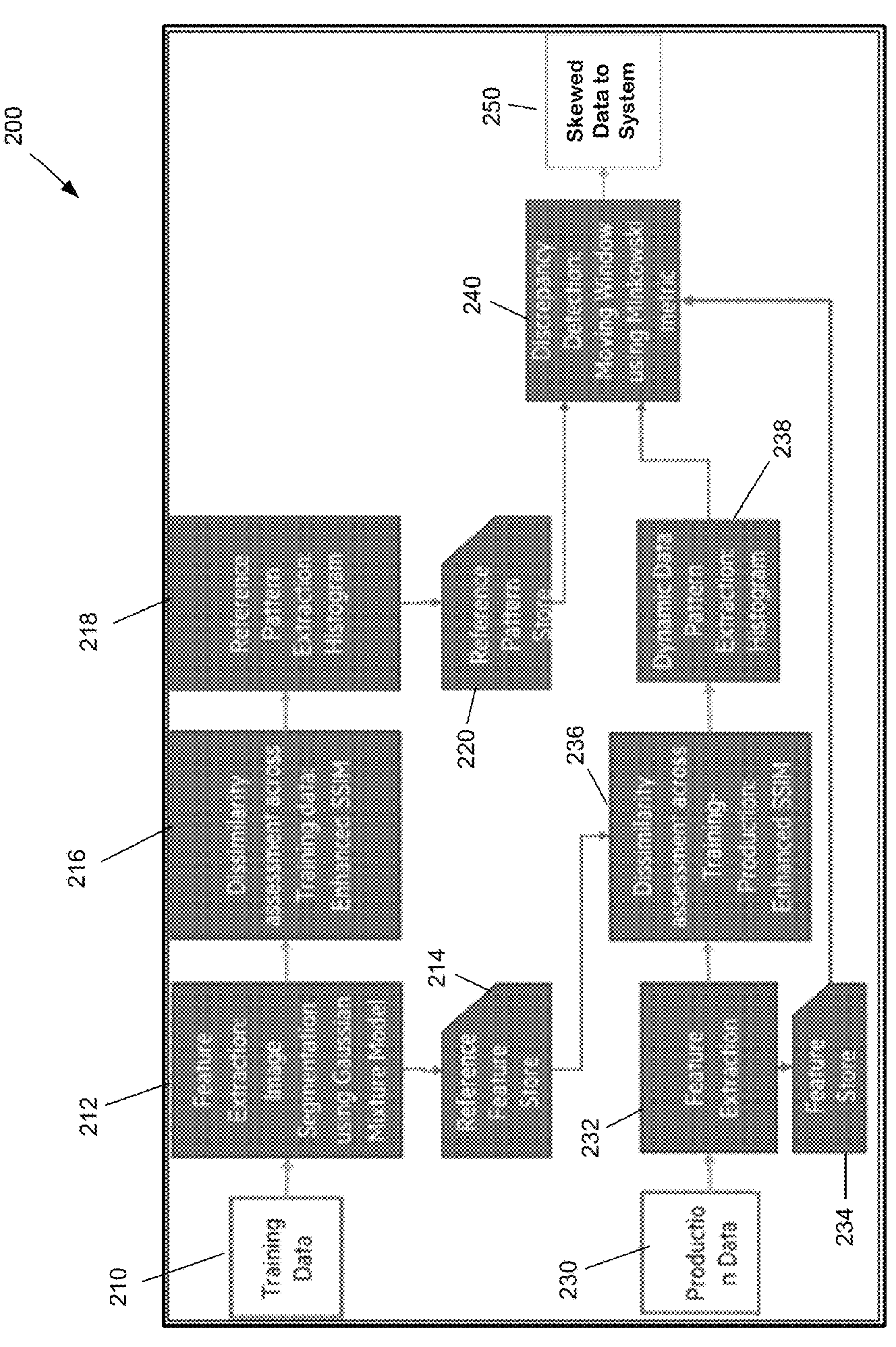
FIG. 2 is an example illustration of a process for detecting skews in data according to various examples of the present disclosure.

FIG. 2 illustrates an example scenario in which the process 200 may selectively perform multiple types of assessments on image datasets, for example, in order to detect any potential data skews in the ML pipeline. In some examples, the process 200 can be executed, for example, by the computing component 110 of FIG. 1. In other examples, the process 200 may be implemented as the computing component 110 of FIG. 1. The computing component 110 may be implemented as, for example, the process 200 of FIG. 2, the process 300 of FIG. 3, and the computing component 500 of FIG. 5. The computing component 110 may include a server.

At step 210 of FIG. 2, the computing component 110 may obtain training data. In one example, the training data may be inputted into the device 150, for the computing component 110 to receive, by a user. In another example, the training data may be stored in a storage of the device 150, for the computing component 110 to obtain from, by a user. The training data may be obtained when the computing component 110 determines that it is in a training phase. The training data may comprise one or more images. Images may comprise photos, x-rays, pictures, diagrams, graphical representations, etc. Images may be 2D or 3D graphical representations of a dataset. Images may be associated to one or more industries, such as healthcare, manufacturing, finance, and life science. Images may be associated to one or more subject matters of an industry, such as the x-ray images of lungs, bones, etc. in the healthcare industry, or images of metal sheets in the metal industry. The training data may be used to train ML models using ML algorithms to make predictions of issues according to real-life data, and solve problems as quickly as possible based on the predictions.

At step 212 of FIG. 2, the computing component 110 may perform feature extraction on the images of the training data. Feature extraction may include extracting features from each image of the training data, extracting superpixel groups of each image of the training data, and labeling each image of the training data. Each image of the training data may include one or more features and/or attributes. Features may include prominent segments in images of persons, objects, structures, human body organs, and any other matter that can be displayed in an image. Attributes may also include age, gender, race, ethnicity, religion, income, demography, material, and any other factors that may be directly associated with one or more features in a particular image.

Features and attributes may be extracted from an image of the training data by performing image segmentation on the image. Image segmentation is a process that may include partitioning an image into multiple segments, with each segment containing a set of pixels. Each segment of an image may be associated to a particular feature or attribute of the image. In this way, performing image segmentation on an image may determine all of the features and attributes of the image, where each feature and attribute may then be extracted and analyzed. In some examples, the image segmentation may be performed using a clustering algorithm such as Gaussian Mixture Model (GMM). The GMM image segmentation approach may be used to cluster pixels of data of an image to determine features of the image. Superpixel groups may be extracted from an image of the training data. Each superpixel group extracted from an image may represent at least one feature of the image. Each superpixel group may have unique identification values associating to the image it is extracted from. A superpixel group may include one or more individual pixels that are grouped together. Each of the individual pixels included in a superpixel group may be associated to the same one or more features of an image.

Each image of the training data may be labeled with at least one label. An image may be labeled according to the features and/or attributes of the image. Images of the same label may be grouped together. An image with more than one label may be placed into the groups for each of its labels. The training data may include a tremendous amount of images and each labeled group of images may each include a tremendous amount of images from the training data. In some examples, each of the images in a labeled group may be applied to the ML models during training. In another example, a set number of images may be selected from all of the images in a labeled group to be the representative images to be applied to the ML models during training. In some examples, the set number may be a random count. In another example, the set number may be based on the total number of images in the labeled group. For example, the set number of images to be the representative images in a labeled group may be 10% of the total number of images in the labeled group. In another example, the set number of images may be chosen by a user. The images that are selected to be the representative images in a labeled group may be random or may be chosen by a user. Each labeled group of images may be stored in a label database. Many variations are possible.

At step 214 of FIG. 2, the computing component 110 may store the superpixel groups of features extracted from the images of the training data in a database. The unique identification values of each superpixel group may also be stored in the database. The database, where the superpixel groups and unique identification values may be stored, may be a feature store. The superpixel groups may be separated in the feature store according to the label(s) of the image that the superpixel groups are extracted from. The superpixel groups and unique identification values stored in the feature store may be used as reference data for future analysis.

At step 216 of FIG. 2, the computing component 110 may perform dissimilarity assessment across the training data. In some examples, performing dissimilarity assessment across the training data may include performing dissimilarity assessment on each of the images of the training data. In other examples, performing dissimilarity assessment across the training data may include performing dissimilarity assessment on each of the representative images of each labeled group of the training data. In some examples, performing dissimilarity assessment may include generating at least one histogram for each image of the training data. In other examples, performing dissimilarity assessment may include generating at least one histogram for each representative image of each labeled group of the training data. A histogram of an image may represent the distribution of superpixel groups of the features in the image. As described above, the representative images in a labeled group may include all of the images in the labeled group, or may be a set number of images that may be a random count, an amount chosen by a user, or an amount based on the total number of images in the labeled group. The images selected to be the representative images may be chosen randomly by the computing component 110 or may be chosen by a user. Many variations are possible.

The dissimilarity assessment may be performed using an image difference algorithm. Examples of image difference algorithms may include Structural Similarity Index Measure (SSIM), Feature Similarity Index Measure (FSIM), means square error (MSE), and Peak Signal to Noise Ratio (PSNR). A histogram of an image that is generated from performing dissimilarity assessment may be grouped in the same labeled group(s) as the image. The histograms may be stored in a database and the histograms may be separated based on their labels.

At step 218 of FIG. 2, the computing component 110 may amalgamate the histograms of the training data. In some examples, amalgamating the histograms of the training data may include computing distance outputs across superpixel groups of the features of all of the images of the training data. In other examples, amalgamating the histograms of the training data may include computing distance outputs across superpixel groups of the features of all of the representative images of a labeled group of the training data, and repeating this process for each labeled group of the training data. Amalgamating histograms of the training data may generate a reference pattern associated to all of the images of the training data. Amalgamating histograms of the representative images of a labeled group of the training data may generate a reference pattern associated to the labeled group of the training data.

At step 220 of FIG. 2, the computing component 110 may store the reference pattern(s) of the training data in a database. The database, where the reference pattern(s) may be stored, may be the feature store. A reference pattern of the training data may be separated in the feature store according to the label(s) of the histograms amalgamated to generate the reference pattern. The reference patterns stored in the feature store may be retrieved by the computing component 110 to perform further analysis.

At step 230 of FIG. 2, the computing component 110 may obtain production data. In one example, the production data may be inputted into the device 150, for the computing component 110 to receive, by a user. In another example, the production data may be stored in a storage of the device 150, for the computing component 110 to obtain from, by a user. The production data may be obtained when the computing component 110 determines that it is in a production phase. The production data may comprise one or more images. Images may comprise photos, x-rays, pictures, diagrams, graphical representations, etc. Images may be 2D or 3D graphical representations of a dataset. Images may be associated to one or more industries, such as healthcare, manufacturing, finance, and life science. Images may be associated to one or more subject matters of an industry, such as the lungs, bones brain, heart, kidney, etc. in the healthcare industry. The production data may be used to train ML models using ML algorithms to make predictions of issues according to real-life data, and solve problems as quickly as possible based on the predictions.

At step 232 of FIG. 2, the computing component 110 may perform feature extraction on the images of the production data. Feature extraction may include extracting features from each image of the production data, extracting superpixel groups of each image of the production data, and labeling each image of the production data. Each image of the production data may include one or more features and/or attributes. Features may include prominent segments in images of persons, objects, structures, items, and any other matter that can be displayed in an image. Attributes may also include age, gender, race, ethnicity, religion, income, demography, material, and any other factors that may be directly associated with one or more features in a particular image.

Features and attributes may be extracted from an image of the production data by performing image segmentation on the image. In some examples, the image segmentation used may be a clustering technique such as Gaussian Mixture Model (GMM). The GMM image segmentation approach may be used to cluster pixels of data of an image to determine features of the image. Superpixel groups may be extracted from an image of the production data. Each superpixel group extracted from an image may represent at least one feature of the image. Each superpixel group may have unique identification values associating to the image it is extracted from. A superpixel group may include one or more individual pixels that are grouped together. Each of the individual pixels included in a superpixel group may be associated to the same one or more features of an image.

Each image of the production data may be labeled with at least one label. An image may be labeled according to the features and/or attributes of the image. Images of the same label may be grouped together. An image with more than one label may be placed into the groups for each of its labels. The production data may include a tremendous amount of images and each labeled group of images may each include a tremendous amount of images from the production data. In some examples, each of the images in a labeled group may be applied to the ML models during production. In another example, a set number of images may be selected from all of the images in a labeled group to be the representative images to be applied to the ML models during production. In some examples, the set number may be a random count. In another example, the set number may be based on the total number of images in the labeled group. For example, the set number of images to be the representative images in a labeled group may be 10% of the total number of images in the labeled group. In another example, the set number of images may be chosen by a user. The images that are selected to be the representative images in a labeled group may be random or may be chosen by a user. Each labeled group of images may be stored in a label database. Many variations are possible.

At step 234 of FIG. 2, the computing component 110 may store the superpixel groups of features extracted from the images of the production data in a database. The unique identification values of each superpixel group extracted from the images of the production data may also be stored in the database. The database, where the superpixel groups and unique identification values may be stored, may be a feature store. The superpixel groups may be separated in the feature store according to the label(s) of the image that the superpixel groups are extracted from. The superpixel groups stored in the feature store may be used as reference data for future analysis.

At step 236 of FIG. 2, the computing component 110 may perform dissimilarity assessment across the production data. In some examples, performing dissimilarity assessment across the production data may include performing dissimilarity assessment on each of the images of the production data. In other examples, performing dissimilarity assessment across the production data may include performing dissimilarity assessment on each of the representative images of each labeled group of the production data. In some examples, performing dissimilarity assessment may include generating at least one histogram for each image of the production data. In other examples, performing dissimilarity assessment may include generating at least one histogram for each representative image of each labeled group of the production data. A histogram of an image may represent the distribution of superpixel groups of features in the image. As described above, the representative images in a labeled group may include all of the images in the labeled group, or may be a set number of images that may be a random count, an amount chosen by a user, or an amount based on the total number of images in the labeled group. The images selected to be the representative images may be chosen randomly by the computing component 110 or may be chosen by a user. Many variations are possible.

The dissimilarity assessment may be performed using an image difference algorithm. Examples of image difference algorithms may include Structural Similarity Index Measure (SSIM), Means Square Error (MSE), and Peak Signal to Noise Ratio (PSNR). A histogram of an image that is generated from performing dissimilarity assessment may be grouped in the same labeled group(s) as the image. The histograms may be stored in a database and the histograms may be separated based on their labels.

At step 238 of FIG. 2, the computing component 110 may amalgamate the histograms of the production data. Amalgamating histograms of the production data may include combining the histograms associated to the production data. In some examples, amalgamating the histograms of the production data may include computing distance outputs across the superpixel groups of features of all of the images of the production data. In other examples, amalgamating the histograms of the production data may include computing distance outputs across the superpixel groups of features of all of the representative images of a labeled group of the production data, and repeating this process for each labeled group of the production data. Amalgamating histograms of the production data may generate a target pattern associated to all of the images of the production data. Amalgamating histograms of the representative images of a labeled group of the production data may generate a target pattern associated to the labeled group of the production data.

The target pattern(s) of the production data may be stored in a database. The database where the target pattern(s) may be stored, may be a target store. A target pattern of the production data may be separated in the target store according to the label(s) of the histograms amalgamated to generate the target pattern. The target patterns stored in the target store may be retrieved by the computing component 110 to perform further analysis.

At step 240 of FIG. 2, the computing component 110 may perform discrepancy detection. To perform discrepancy detection, the computing component 110 may first obtain a reference pattern associated to the training data and a target pattern associated to the production data. Discrepancy detection may be performed between the target pattern and the reference pattern that are obtained by the computing component 110. In some examples, the target pattern may be associated to all of the images of the production data. In other examples, the target pattern may be associated to images of a labeled group of the production data. When the target pattern obtained is associated to all of the images of the production data, the reference pattern may be associated to all of the images of the training data. When the target pattern is associated to images of a labeled group of the production data, the reference pattern may be associated to images of the same/similar labeled group of the training data. In this way, the target pattern and the reference pattern that are used to perform the discrepancy detection are based on similar images from the production data and training data, respectively.

Figure 3:
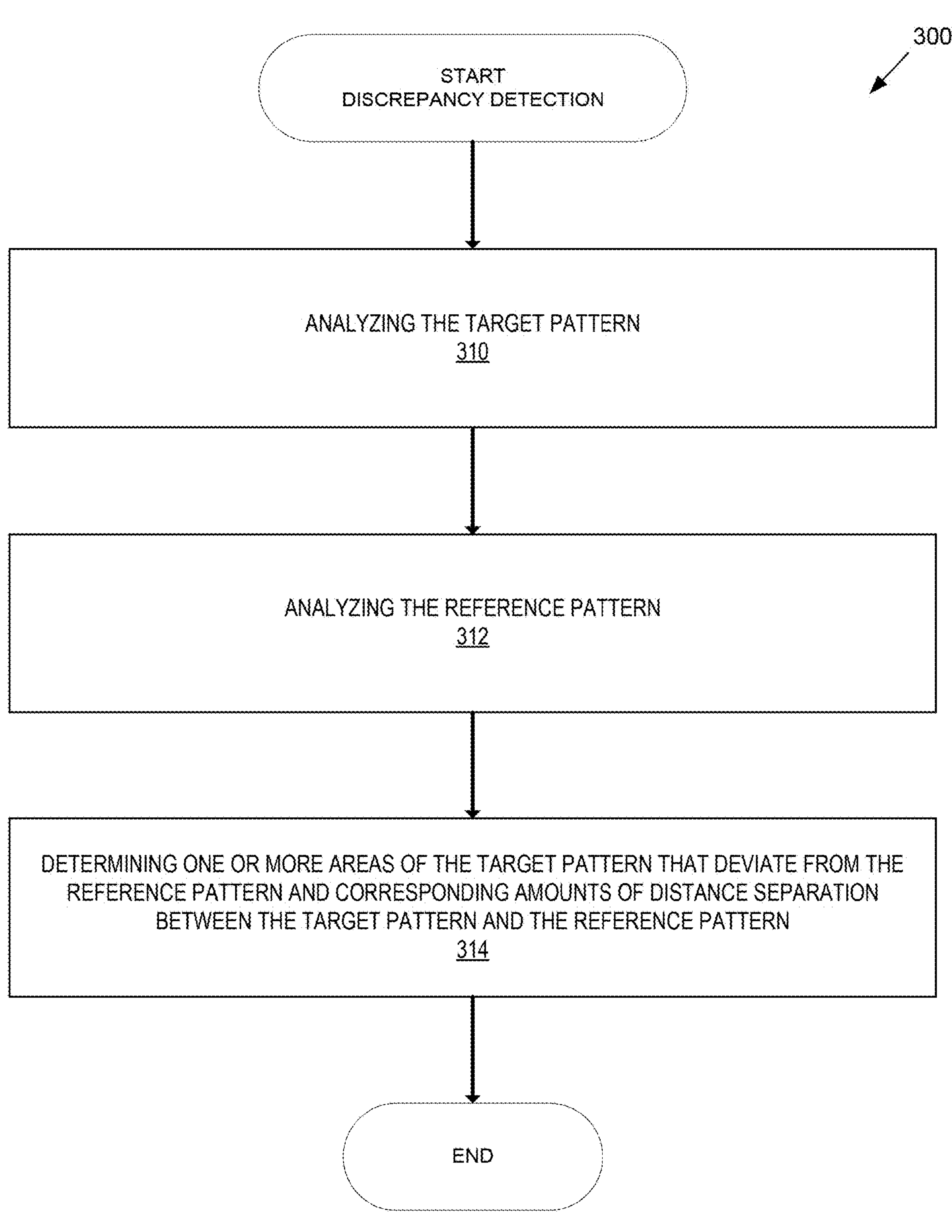
FIG. 3 is an example flowchart of a process for performing discrepancy detection between a target pattern of production data and a reference pattern of training data, according to various examples of the present disclosure.

Performing the discrepancy detection between the target pattern and the reference pattern may include analyzing the target pattern, analyzing the reference pattern, and determining one or more areas of the target pattern that deviate from the reference pattern and corresponding amounts of distance separation between the target pattern and the reference pattern, as shown in FIG. 3. FIG. 3 illustrates an example scenario in which the process 300 may perform discrepancy detection between the target pattern and the reference pattern. In some examples, the process 300 can be executed, for example, by the computing component 110 of FIG. 1. In other examples, the process 300 may be implemented as the computing component 110 of FIG. 1. The computing component 110 may be implemented as the process 200 of FIG. 2, the process 300 of FIG. 3, and the computing component 500 of FIG. 5. The computing component 110 may include a server.

At step 310 of FIG. 3, the computing component 110 may analyze the target pattern. Analyzing the target pattern may generate data pattern vectors of the target pattern. Analyzing the target pattern to generate data pattern vectors of the target pattern may include running a sliding visual window across the images of the production data associated to the target pattern. In some examples, a sliding visual window may run across all of the images of the production data when the target pattern is associated to all of the images of the production data. In another example, a sliding visual window may run across the representative images of a labeled group of the production data when the target pattern is associated to the images of the production data in the labeled group. The data pattern vectors may show patterns between the images of the production data associated to the target pattern.

At step 312 of FIG. 3, the computing component 110 may analyze the reference pattern. Analyzing the reference pattern may generate data pattern vectors of the reference pattern. Analyzing the reference pattern to generate data pattern vectors of the reference pattern may include running a sliding visual window across the images of the training data associated to the reference pattern. In some examples, a sliding visual window may be ran across all of the images of the training data when the reference pattern is associated to all of the images of the training data. In another example, a sliding visual window may be ran across the representative images of a labeled group of the training data when the reference pattern is associated to the images of the training data in the labeled group. The data pattern vectors may show patterns between the images of the training data associated to the reference pattern.

At step 314 of FIG. 3, the computing component 110 may determine one or more areas of the target pattern that deviate from the reference pattern and corresponding amounts of distance separation between the target pattern and the reference pattern. Areas of the target pattern that deviate from the reference pattern and corresponding distance separation between the target pattern and the reference pattern may be determined by comparing the target pattern from the reference pattern. Comparing the target pattern from the reference pattern may include comparing the data pattern vectors of the target pattern from the data pattern vectors of the reference pattern. While comparing the data pattern vectors of the target pattern from the data pattern vectors of the reference pattern, a distance metric, such as the Minkowski distance metric, may be employed across the two sets of data pattern vectors. Employing a distance metric across the two sets of data pattern vectors may determine distance separation between the two sets of data pattern vectors. There may be multiple distance separations between the two sets of data pattern vectors. Each distance separation that is determined between the two sets of data pattern vectors may have its own measurement based on the distance metric applied.

At step 250 of FIG. 2, the computing component 110 may determine a skew in the data between the target pattern and the reference pattern. The skew in the data between the target pattern and the reference pattern may be based on the distance separation determined between the target pattern and the reference pattern, as described in FIG. 3. In some examples, the skew in the data may be the maximum distance separation measurement determined between the target pattern and the reference pattern. In other examples, the skew in the data may be the average of the distance separation measurements determined between the target pattern and the reference pattern. Many variations are possible.

A notification may be sent to a system when a skew is determined between the target pattern of production images and the reference pattern of training images. The system may monitor the data analysis and prediction performance being executed using the ML algorithms and ML models, based on the data received during training and production. The notification may include a message describing the skew in the data between the production images and the training images. The message in the notification may also include the analysis leading to the skew result in the data between the production images and the training images. Upon receiving the notification, the system may initial remedial actions to resolve the skew, based on the analysis and results of the skew. Remedial actions may include addressing the skewness in the training data and production data, and mitigating inaccuracies in the model prediction using the ML algorithms and ML models during the serving phase. The notification may also be sent to a user. In one example, the user receiving the notification of the skew may be the entity who provided the production data and/or the training data. In another example, the user receiving the notification of the skew may be the entity who submitted a request to analyze the production data to the training data to determine if any skews are present.

For simplicity of description, the processes 200 and 300 are described as being performed with respect to a single set of images of training data and a single set of images of production data. It should be appreciated that, in a typical example, the computing component 110 may manage multiple sets of images of training data and multiple sets of images of production data in short succession of one another. For example, in some examples, the computing component 110 can perform many, if not all, of the steps in processes 200 and 300 on a plurality of sets of images of training data and a plurality of sets of images of production data as the training data and/or production data are received or obtained.

As explained, the processes 200 and 300 may provide a solution in detecting skews across both unstructured and structured data sets. This may ensure upfront detection, as well as runtime detection, of skew, and allow a user to address skewness in data and mitigate inaccuracies in model prediction during the inference phase. Processes 200 and 300 may also provide improvements in the computational process of the ML training pipeline model by incorporating concurrent pipeline processing across multiple CPU resources. These improvements may also mitigate manual user inspection, mitigate trial and error for image segmentation, augment accuracy in feature detection, and accelerate computational performance of the solution.

Figures 4A, 4B, 4C:
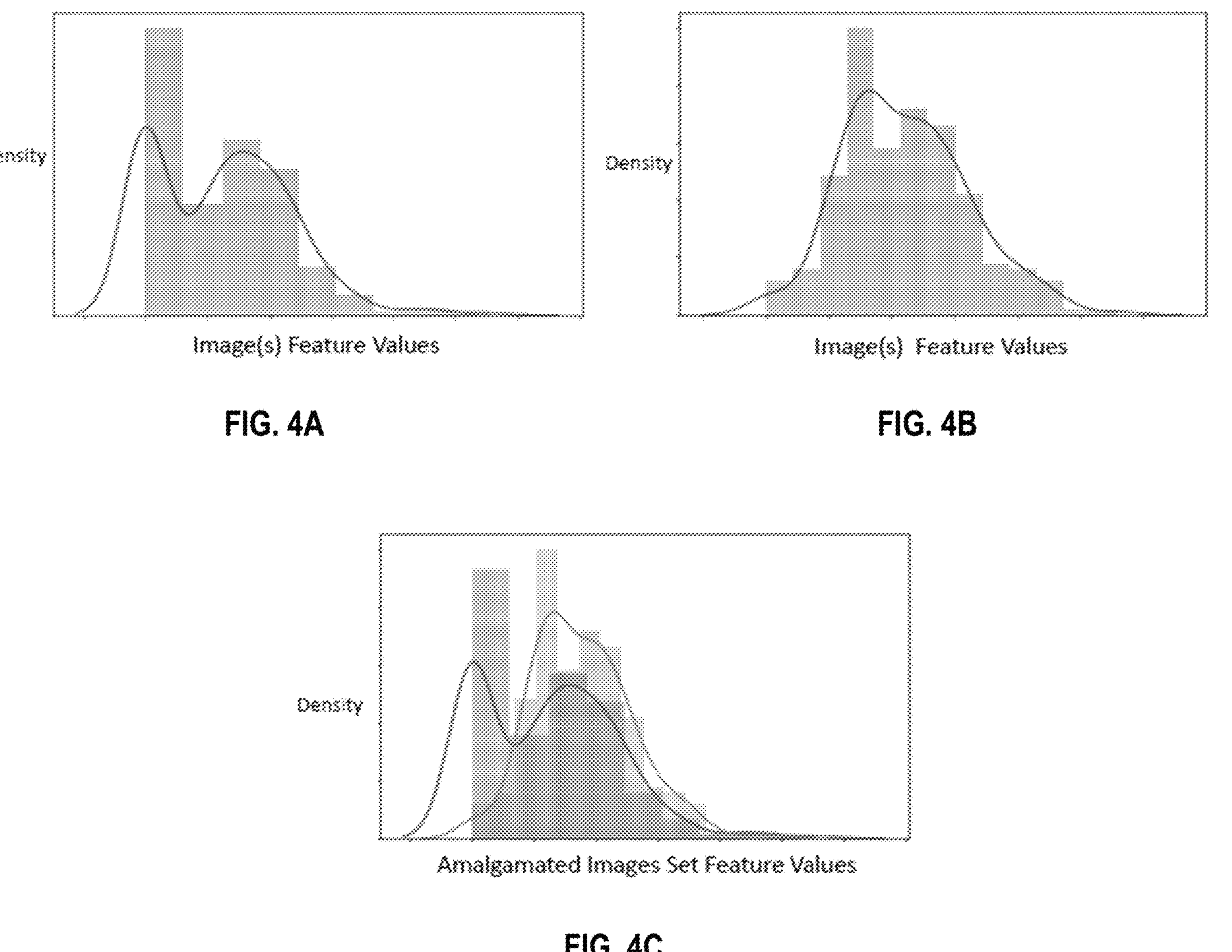
FIGS. 4A and 4B are example illustrations of distribution patterns of training images, according to various examples of the present disclosure.
FIG. 4C is an example illustration of a reference pattern that is generated from the amalgamation of distribution patterns of training images, according to various examples of the present disclosure.

FIGS. 4A and 4B illustrates example graphical representations of histograms of images. A histogram may represent the distribution of superpixel groups of features in an image, based on the density of data at different locations of the image. Each block in the histogram may represent a different superpixel group of an image. The y-axis of the histogram may present values of the estimated densities of particular superpixel groups of the image. The x-axis of the histogram may present the spread of the superpixel group values of the image. FIG. 4A may represent a histogram of a first image in a set of images and FIG. 4B may represent a histogram of a second image in the same set of images. For example, when performing dissimilarity assessment across the training data, the training data may include a plurality of images of a first label group. A histogram may be generated for a first image of the first label group, which may be represented as FIG. 4A. A histogram may be generated for a second image of the first label group, which may be represented as FIG. 4B. The histogram of each image may display a different distribution of superpixel groups representing features for each image and present different values of density and spread for the superpixel groups representing features for each image.

FIG. 4C illustrates an example graphical representation of histograms amalgamated together. Histograms, such as the histograms of FIGS. 4A and 4B, may be amalgamated together, as shown in FIG. 4C, to generate a net histogram. The amalgamation of multiple histograms of a set of images may generate a pattern, such as a reference pattern or target pattern, that are numerical data for images of training data or production data, respectively. Amalgamating histograms may include spreading superpixel groups across the features of all of the images associated to the histograms. The reference pattern and the target pattern generated from amalgamating histograms of images of training data and amalgamating histograms of images of production data, respectively, may be used determine skews in data, as described in FIGS. 2 and 3 above.

FIG. 5 illustrates a computing component 500 that includes one or more hardware processors 502 and machine-readable storage media 504 storing a set of machine-readable/machine-executable instructions that, when executed, cause the hardware processor(s) 502 to perform an illustrative method of reducing computing costs while maintaining network services and performance. It should be appreciated that there can be additional, fewer, or alternative steps performed in similar or alternative orders, or in parallel, within the scope of the various examples discussed herein unless otherwise stated. The computing component 500 may be implemented as the computing component 110 of FIG. 1, the process 200 of FIG. 2, and the process 300 of FIG. 3. FIG. 5 summarizes and further elaborates on some aspects previously described.

At step 506, the hardware processor(s) 502 may execute machine-readable/machine-executable instructions stored in the machine-readable storage media 504 to obtain a reference pattern associated to training data. A reference pattern may be previously generated from data obtained during training of ML models using ML algorithms. In some examples, data may be obtained during training from a user. In other examples, data may be obtained during training from a storage, where the data was stored.

The data obtained during training (hereinafter, "training data") may include images. Each image of the training data may include at least one feature. Each feature of an image may be extracted by conducting image segmentation on the image. Using the features extracted from an image, superpixel groups of the image may be extracted wherein each superpixel group is associated to at least one feature. The image may be labeled according to the features extracted from the image.

Dissimilarity assessment may be performed across each image of the training data. Performing dissimilarity assessment on an image may generate at least one histogram associated to the image. Each image and the image's associated histogram(s) may be grouped with other images and their associated histograms that have the same label(s). In this way, images and associated histograms with the same label(s), and thus the same/similar features, may be placed in the same labeled group of images for ease of reference.

The histograms of images from the a labeled group may be amalgamated to generate a reference pattern for the particular labeled group. Amalgamating histograms of images from a labeled group may include computing distance outputs across the superpixel groups of features of all of the images in the labeled group. The reference pattern for a labeled group may be stored in a storage, such as a feature store, for future use.

At step 508, the hardware processor(s) 502 may execute machine-readable/machine-executable instructions stored in the machine-readable storage media 504 to obtain a target pattern associated to production data. A target pattern may be previously generated from data obtained during a production phase (hereinafter, "production data"), wherein the production data is applied to trained ML models using ML algorithms to analyze the data and make predictions. In some examples, data may be obtained during the production phase from a user. In other examples, data may be obtained during the production phase from a storage, where the data was previously stored by a user.

The production data may include images. Each image of the production data may include at least one feature. Each feature of an image may be extracted by conducting image segmentation on the image. Using the features extracted from an image, superpixel groups of the image may be extracted wherein each superpixel group is associated to at least one feature. The image may be labeled according to the features extracted from the image.

Dissimilarity assessment may be performed across images of the production data. Performing dissimilarity assessment on an image may generate at least one histogram associated to the image. Each image and the image's associated histogram(s) may be grouped with other images and their associated histograms that have the same label(s). In this way, images and associated histograms with the same label(s), and thus the same/similar features, may be placed in the same labeled group of images for ease of reference.

The histograms of images from the labeled group may be amalgamated to generate a target pattern for the particular labeled group. Amalgamating histograms of images from a labeled group may include spreading superpixel groups across the features of all of the images in the labeled group. The target pattern for a labeled group may be stored in a storage, such as a feature store, for future use.

At step 510, the hardware processor(s) 502 may execute machine-readable/machine-executable instructions stored in the machine-readable storage media 504 to perform discrepancy detection between the target pattern and the reference pattern. Discrepancy detection may be performed between the target pattern and the reference pattern. In one example, the target pattern may be associated to images of a labeled group of the production data. In another example, the target pattern may be associated to images of an unlabeled group of the production data of a batch size that may be specified by a user. When the target pattern is associated to images of a group of the production data, whether labeled or unlabeled, the reference pattern may be associated to images of a same/similar or dissimilar labeled group of the training data. Performing discrepancy detection across a target pattern and a reference pattern that are associated to similar images may result in low dissimilarity across the production data and the training data. Performing discrepancy detection across a target pattern and a reference pattern that are associated to dissimilar images may result in high dissimilarity across the production data and the training data.

Performing the discrepancy detection between the target pattern and the reference pattern may include analyzing the target pattern, analyzing the reference pattern, and determining one or more areas of the target pattern that deviate from the reference pattern and corresponding amounts of distance separation between the target pattern and the reference pattern. Analyzing the target pattern may generate data pattern vectors of the target pattern. Analyzing the target pattern to generate data pattern vectors of the target pattern may include running a sliding visual window across the images of the production data associated to the target pattern. The sliding visual window may run across the images of a labeled group of the production data when the target pattern is associated to the images of the production data in the labeled group. The data pattern vectors may show patterns between the images of the production data in the labeled group associated to the target pattern.

Analyzing the reference pattern may generate data pattern vectors of the reference pattern. Analyzing the reference pattern to generate data pattern vectors of the reference pattern may include running a sliding visual window across the images of the training data associated to the reference pattern. The sliding visual window may be ran across the images of a labeled group of the training data when the reference pattern is associated to the images of the training data in the labeled group. The data pattern vectors may show patterns between the images of the training data in the labeled group associated to the reference pattern.

Areas of deviation and corresponding distance separation between the target pattern and the reference pattern may be determined by comparing the target pattern from the reference pattern. Comparing the target pattern from the reference pattern may include comparing the data pattern vectors of the target pattern from the data pattern vectors of the reference pattern. While comparing the data pattern vectors of the target pattern from the data pattern vectors of the reference pattern, a distance metric, such as the Minkowski distance metric, may be employed across the two sets of data pattern vectors. Employing a distance metric across the two sets of data pattern vectors may determine distance separation between the two sets of data pattern vectors. There may be multiple distance separations between the two sets of data pattern vectors. Each distance separation that is determined between the two sets of data pattern vectors may have its own measurement based on the distance metric applied.

At step 512, the hardware processor(s) 502 may execute machine-readable/machine-executable instructions stored in the machine-readable storage media 504 to determine a skew between the target pattern and the reference pattern. The skew in the data between the target pattern and the reference pattern may be based on the distance separation determined between the target pattern and the reference pattern. In one example, the skew in the data may be the maximum distance separation measurement determined between the target pattern and the reference pattern. In another example, the skew in the data may be the average of the distance separation measurements determined between the target pattern and the reference pattern.

At step 514, the hardware processor(s) 502 may execute machine-readable/machine-executable instructions stored in the machine-readable storage media 504 to send a notification of the skew to a system. A notification may be sent to a system when a skew is determined between the target pattern of production images and the reference pattern of training images. The system may monitor the data analysis and prediction performance being executed using the ML algorithms and ML models, based on the data received during training and production. The notification may include a message describing the skew in the data between the production images and the training images. The message in the notification may also include the analysis leading to the skew result in the data between the production images and the training images. Upon receiving the notification, the system may initial remedial actions to resolve the skew, based on the analysis and results of the skew. Remedial actions may include addressing the skewness in the training data and production data, and mitigating inaccuracies in the model prediction using the ML algorithms and ML models during the serving phase. The notification may also be sent to a user. In one example, the user receiving the notification of the skew may be the entity who provided the production data and/or the training data. In another example, the user receiving the notification of the skew may be the entity who submitted a request to analyze the production data to the training data to determine if any skews are present.

Subsequently, the hardware processor(s) 502 may receive subsequent images of training data and images of production data from a user and repeat the aforementioned steps for each of the subsequent images received, until images of training data and images of production data are no longer being received from the user.

FIG. 6 illustrates a block diagram of an example computer system 600 in which various of the examples described herein may be implemented. For example, the functionality of one or more of the elements, network functions, etc. illustrated in any of FIGS. 1-5 may be implemented or effectuated by computer system 600. The computer system 600 can include a bus 602 or other communication mechanism for communicating information, one or more hardware processor(s) 604 coupled with bus 602 for processing information. Hardware processor(s) 604 may be, for example, one or more general purpose microprocessors.

The computer system 600 may also include a main memory 606, such as a random access memory (RAM), cache and/or other dynamic storage devices, coupled to bus 602 for storing information and instructions to be executed by hardware processor(s) 604. Main memory 606 may also be used for storing temporary variables or other intermediate information during execution of instructions to be executed by the hardware processor(s) 604. Such instructions, when stored in storage media accessible to hardware processor(s) 604, render computer system 600 into a special-purpose machine that is customized to perform the operations specified in the instructions.

The computer system 600 may further include a read only memory (ROM) 608 or other static storage device coupled to the bus 602 for storing static information and instructions for hardware processor(s) 604. A storage device 610, such as a magnetic disk, optical disk, or USB thumb drive (Flash drive), etc., can be provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, may be coupled to bus 602 for communicating information and command selections to hardware processor(s) 604. Another type of user input device may be cursor control 616, such as a mouse, a trackball, or cursor direction keys for communicating direction information and command selections to hardware processor(s) 604 and for controlling cursor movement on display 612. In some examples, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "modules," "engine," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices, such as the computing system 600, may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques or technology described herein using customized hard-wired logic, one or more ASICs or FPGAS, firmware and/or program logic which in combination with the computer system 600 that causes or programs computer system 600 to be a special-purpose machine. According to one example, the techniques herein may be performed by computer system 600 in response to the hardware processor(s) 604 executing one or more sequences of one or more instructions contained in main memory 606. Such instructions may be read into main memory 606 from another storage medium, such as storage device 610. Execution of the sequences of instructions contained in main memory 606 can cause the hardware processor(s) 604 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media can include, for example, optical or magnetic disks, such as storage device 610. Volatile media can include dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media can participate in transferring information between non-transitory media. For example, transmission media can include coaxial cables, copper wire and fiber optics, including the wires that comprise bus 602. Transmission media can also take the form of acoustic or light waves, such as those generated during radio-wave and infra-red data communications.

Computer system 600 can further include at least one network interface 618, such as a network interface controller module (NIC), network adapter, or the like, or a combination thereof, coupled to the bus 602 for connecting the computer system 600 to at least one network. Network interface 618 may provide a two-way data communication coupling to one or more network links that are connected to one or more local networks. For example, network interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicate with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through network interface 618, which carry the digital data to and from computer system 600, are example forms of transmission media.

The computer system 600 can send messages and receive data, including program code, through the network(s), network link and network interface 618. In the Internet example, a server might transmit a requested code for an application program through the Internet, the ISP, the local network and the network interface 618. The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A computing system for data skew detection comprising:

one or more processors; and a non-transitory computer readable medium including instructions that, when executed by the one or more processors, cause the one or more processors to perform operations of:

obtaining a reference pattern associated with training images that are labeled with a first label to form a first label group, by amalgamating histograms of training superpixel groups from the training images;

obtaining a target pattern associated with production images that are labeled with the first label, by amalgamating histograms of production superpixel groups from the production images;

performing discrepancy detection between the target pattern and the reference pattern by:

analyzing the target pattern;

analyzing the reference pattern; and determining one or more areas of the target pattern that deviate from the reference pattern and corresponding amounts of distance separation between the target pattern and the reference pattern;

determining a skew between the target pattern and the reference pattern, wherein the skew is the maximum distance separation between the target pattern and the reference pattern; and sending a notification of the skew to a monitoring system for the monitoring system to initiate remedial actions to resolve the skew, wherein the notification comprises analysis and results of the target pattern, the reference pattern and the skew;

wherein determining one or more distance separation between the target pattern and the reference pattern comprises employing a Minkowski distance metric across target data pattern vectors of the target pattern and reference data pattern vectors of the reference pattern.

2. The computing system of claim 1, wherein the obtaining the reference pattern of the first label group comprises:

obtaining, from a data storage, training data to train Machine Learning (ML) models using ML algorithms, wherein the training data comprises one or more training images;

performing feature extraction on the one or more training images by:

extracting one or more training features of a first training image of the one or more training images by conducting image segmentation on the first training image;

extracting the training superpixel groups of the first training image associated with the one or more training features, wherein a superpixel group comprises one or more pixels associated with a feature of an image; and labeling the first training image according to the one or more training features of the first training image;

performing dissimilarity assessment on each of the one or more training images to generate one or more training histograms, wherein each training image has an associated training histogram;

grouping the first training image and associated first training histogram into the first label group of a plurality of label groups of the training data according to the label of the first training image, wherein the first label group comprises training images and associated training histograms of the same label; and amalgamating the one or more training histograms of the first label group to generate the reference pattern associated with the training images of the first label group.

3. The computing system of claim 2, wherein the medium further includes instructions that cause the one or more processors to perform operations of:

storing the training superpixel groups in a feature store;

storing the plurality of label groups into a label database; and storing the reference pattern of the first label group in a reference pattern store.

4. The computing system of claim 2, wherein the amalgamating the one or more training histograms of the first label group to generate the reference pattern associated with the training images of the first label group comprises:

determining a spread across values of the training superpixel groups of each training image in the first label group.

5. The computing system of claim 1, wherein the obtaining the target pattern comprises:

receiving, from a user, one or more production images;

performing feature extraction on the one or more production images by:

extracting one or more production features of a first production image of the one or more production images by conducting image segmentation on the first production image; and extracting production superpixel groups of the first production image associated with the one or more production features, wherein a superpixel group comprises one or more pixels associated with a feature of an image;

performing dissimilarity assessment on each of the one or more production images to generate one or more production histograms, wherein each production image has an associated production histogram; and amalgamating the one or more production histograms to generate the target pattern associated with the production images.

6. The computing system of claim 5, wherein the medium further includes instructions that cause the one or more processors to perform operations of:

labeling the first production image according to the one or more production features of the first production image; and grouping the first production image and the associated first production histogram into a second label group of a plurality of label groups according to the label of the first production image, wherein the second label group comprises production images and associated production histograms of the same label.

7. The computing system of claim 5, wherein the medium further includes instructions that cause the one or more processors to perform operations of:

storing the production superpixel groups in a feature store.

8. The computing system of claim 5, wherein the amalgamating the one or more production histograms to generate the target pattern associated with the production images comprises:

determining a spread across values of the production superpixel groups of each production image.

9. The computing system of claim 2, wherein the conducting image segmentation on the first training image comprises using a Gaussian Mixture Model (GMM) to cluster pixels of the first training image.

10. The computing system of claim 5, wherein the conducting image segmentation on the first production image comprises using a Gaussian Mixture Model (GMM) to cluster pixels of the first production image.

11. The computing system of claim 2, wherein the performing dissimilarity assessment on each of the one or more training images comprises using a technique comprising Structural Similarity Index Measure (SSIM), Means Square Error (MSE), or Peak Signal to Noise Ratio (PSNR).

12. The computing system of claim 5, wherein the performing dissimilarity assessment on each of the one or more production images comprises using a technique comprising Structural Similarity Index Measure (SSIM), Means Square Error (MSE), or Peak Signal to Noise Ratio (PSNR).

13. The computing system of claim 1, wherein analyzing the target pattern comprises running a sliding visual window across the production images associated with the target pattern to generate target data pattern vectors of the target pattern.

14. The computing system of claim 1, wherein analyzing the reference pattern of the first label group comprises running a sliding visual window across the training images associated with the reference pattern to generate reference data pattern vectors of the reference pattern.

15. A computer-implemented method of a computing system comprising a server and a database, the method comprising:

obtaining a reference pattern associated with training images that are labeled with a first label to form a first label group, by amalgamating histograms of training superpixel groups from the training images;

obtaining a target pattern associated with production images that are labeled with the first label, by amalgamating histograms of production superpixel groups from the production images;

performing discrepancy detection between the target pattern and the reference pattern by:

analyzing the target pattern by running a first sliding visual window across the production images associated with the target pattern to generate target data pattern vectors of the target pattern;

analyzing the reference pattern by running a second sliding visual window across the training images associated with the reference pattern to generate reference data pattern vectors of the reference pattern; and determining one or more areas of the target pattern that deviate from the reference pattern and corresponding amounts of distance separation between the target pattern and the reference pattern;

determining a skew between the target pattern and the reference pattern, wherein the skew is the maximum distance separation between the target pattern and the reference pattern; and sending a notification of the skew to a monitoring system for the monitoring system to initiate remedial actions to resolve the skew, wherein the notification comprises analysis and results of the target pattern, the reference pattern and the skew;

wherein determining one or more distance separation between the target pattern and the reference pattern comprises employing a Minkowski distance metric across target data pattern vectors of the target pattern and reference data pattern vectors of the reference pattern.

16. The computer-implemented method of claim 15, wherein the obtaining the reference pattern of the first label group comprises:

obtaining, from a data storage, training data to train Machine Learning (ML) models using ML algorithms, wherein the training data comprises one or more training images;

performing feature extraction on the one or more training images by:

extracting one or more training features of a first training image of the one or more training images by conducting image segmentation on the first training image;

extracting the training superpixel groups of the first training image associated with the one or more training features, wherein a superpixel group comprises one or more pixels associated with a feature of an image; and labeling the first training image according to the one or more training features of the first training image;

performing dissimilarity assessment on each of the one or more training images to generate one or more training histograms, wherein each training image has an associated training histogram;

grouping the first training image and associated first training histogram into the first label group of a plurality of label groups of the training data according to the label of the first training image, wherein the first label group comprises training images and associated training histograms of the same label; and amalgamating the one or more training histograms of the first label group to generate the reference pattern associated with the training images of the first label group.

17. The computer-implemented method of claim 16, wherein the amalgamating the one or more training histograms of the first label group to generate the reference pattern associated with the training images of the first label group comprises:

determining a spread across values of the training superpixel groups of each training image in the first label group.

18. The computer-implemented method of claim 15, wherein the obtaining the target pattern comprises:

receiving, from a user, one or more production images;

performing feature extraction on the one or more production images by:

extracting one or more production features of a first production image of the one or more production images by conducting image segmentation on the first production image; and extracting production superpixel groups of the first production image associated to the one or more production features, wherein a superpixel group comprises one or more pixels associated with a feature of an image;

performing dissimilarity assessment on each of the one or more production images to generate one or more production histograms, wherein each production image has an associated production histogram; and amalgamating the one or more production histograms to generate the target pattern associated with the production images.

19. A non-transitory storage medium storing instructions that, when executed by at least one processor of a computing system, cause the computing system to perform a method comprising:

obtaining a reference pattern associated with training images that are labeled with a first label to form a first label group, by amalgamating histograms of superpixel groups from the training images;

obtaining a target pattern associated with production images that are labeled with the first label, by amalgamating histograms of superpixel groups from the production images;

performing discrepancy detection between the target pattern and the reference pattern by:

analyzing the target pattern by running a first sliding visual window across the production images associated with the target pattern to generate target data pattern vectors of the target pattern;

analyzing the reference pattern by running a second sliding visual window across the training images associated with the reference pattern to generate reference data pattern vectors of the reference pattern; and determining one or more areas of the target pattern that deviate from the reference pattern and corresponding amounts of distance separation between the target pattern and the reference pattern;

determining a skew between the target pattern and the reference pattern, wherein the skew is the maximum distance separation between the target pattern and the reference pattern; and sending a notification of the skew to a monitoring system for the monitoring system to initiate remedial actions to resolve the skew, wherein the notification comprises analysis and results of the target pattern, the reference pattern and the skew;

wherein determining one or more distance separation between the target pattern and the reference pattern comprises employing a Minkowski distance metric across target data pattern vectors of the target pattern and reference data pattern vectors of the reference pattern.

20. The computing system of claim 1, wherein analyzing the target pattern comprises running a sliding visual window to generate the target data pattern vectors, and analyzing the reference pattern comprises running a sliding visual window to generate the reference data pattern vectors.

* * * * *